US007729449B2

(12) United States Patent
Okada et al.

(10) Patent No.: US 7,729,449 B2
(45) Date of Patent: Jun. 1, 2010

(54) DIGITAL SIGNAL PROCESSING AND RECEIVING APPARATUS AND METHOD

(75) Inventors: Hiroki Okada, Toyota (JP); Yuichi Murakami, Chiryu (JP)

(73) Assignees: Toyota Jidosha Kabushiki Kaisha, Toyota-shi (JP); Aisin Seiki Kabushiki Kaisha, Kariya-shi (JP)

( * ) Notice: Subject to any disclaimer, the term of this patent is extended or adjusted under 35 U.S.C. 154(b) by 710 days.

(21) Appl. No.: 11/023,694

(22) Filed: Dec. 29, 2004

(65) Prior Publication Data

US 2005/0123071 A1    Jun. 9, 2005

Related U.S. Application Data

(63) Continuation of application No. PCT/JP03/008213, filed on Jun. 27, 2003.

(30) Foreign Application Priority Data

Jul. 30, 2002    (JP)    ............... 2002-222005

(51) Int. Cl.
    *H04B 1/69* (2006.01)
(52) U.S. Cl. .............. 375/316; 375/322; 375/324; 375/340; 329/300; 329/303; 455/130
(58) Field of Classification Search ............... 375/316; 455/130
    See application file for complete search history.

(56) References Cited

U.S. PATENT DOCUMENTS

| 4,307,380 A | * | 12/1981 | Gander | ............ | 340/538.11 |
| 4,763,290 A | * | 8/1988 | Cowen | ............ | 708/5 |
| 4,870,659 A | * | 9/1989 | Oishi et al. | ............ | 375/328 |
| 5,081,650 A | * | 1/1992 | Hasegawa et al. | ............ | 375/324 |
| 5,373,533 A | * | 12/1994 | Hayashihara et al. | ............ | 375/334 |
| 5,548,652 A | * | 8/1996 | Fujiwara et al. | ............ | 381/71.6 |
| 5,974,101 A | * | 10/1999 | Nago | ............ | 375/350 |

(Continued)

FOREIGN PATENT DOCUMENTS

CN    86103321 A    12/1986

(Continued)

OTHER PUBLICATIONS

Herbert Taub "Principles of Communication Systems" Second Edition, pp. 276-277.*

(Continued)

*Primary Examiner*—David C Payne
*Assistant Examiner*—Leon Flores
(74) *Attorney, Agent, or Firm*—Kenyon & Kenyon LLP

(57) ABSTRACT

A DSP tuner, which is equipped with an A/D converter and a digital signal processing part, is provided to the receiving parts of an in-vehicle equipment and a portable equipment that constitute an in-vehicle equipment remote control system. The A/D converter quantizes analog input signals received by receiving antennas and converts them into digital values. The digital signal processing part always appears, and removes as a noise a frequency band of which spectrum hardly change within a predetermined time period. Moreover, the digital signal processing part sets a frequency band with a comparatively large spectrum change as an FSK modulation signal corresponding to code contents, and outputs binary data corresponding to the frequency band as a code signal.

5 Claims, 9 Drawing Sheets

U.S. PATENT DOCUMENTS

| | | | |
|---|---|---|---|
| 6,140,954 A * | 10/2000 | Sugawara et al. | 342/70 |
| 6,370,130 B1 | 4/2002 | Zhou et al. | |
| 6,836,181 B2 * | 12/2004 | Yoshida | 329/300 |
| 7,110,465 B2 * | 9/2006 | Kaku et al. | 375/285 |
| 2003/0002590 A1 * | 1/2003 | Kaku et al. | 375/285 |

FOREIGN PATENT DOCUMENTS

| | | |
|---|---|---|
| JP | 61-281365 | 12/1986 |
| JP | 06-291688 | 10/1994 |
| JP | 06-349208 | 12/1994 |
| JP | 08-8744 | 1/1996 |
| JP | 09-89671 | 4/1997 |
| JP | 09-117424 | 5/1997 |
| JP | 10-341184 | 12/1998 |
| JP | 2000-13357 | 1/2000 |
| JP | 2001-216000 A | 8/2001 |
| JP | 2002-64389 | 2/2002 |
| WO | WO00/25512 | 5/2000 |

OTHER PUBLICATIONS

English Translation of Chinese Office Action for Application No. 038181762 mailed Nov. 10, 2006.

International Search Official Communication for Appn. No. 03 736 290.2 issued Aug. 9, 2006.

* cited by examiner

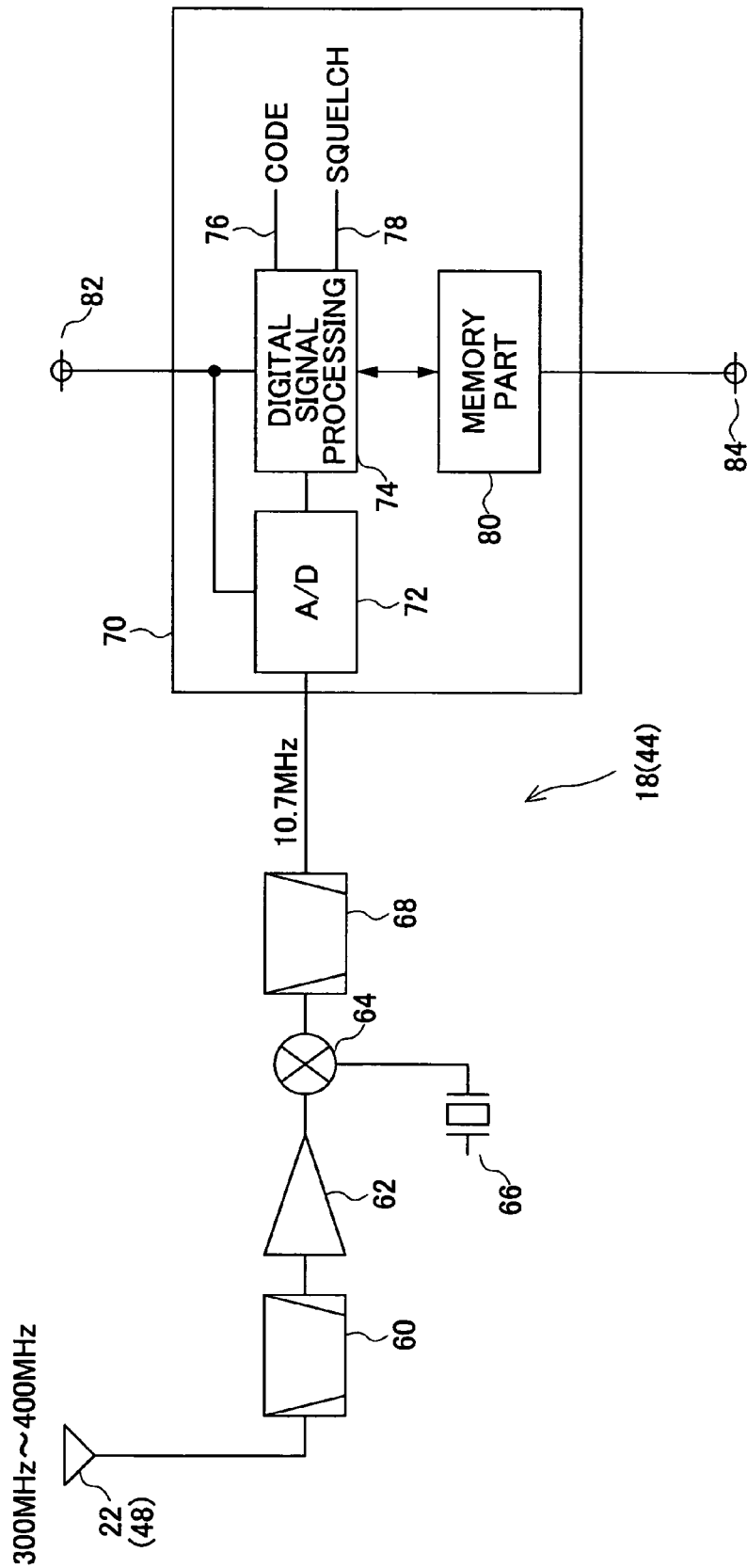

DIGITAL SIGNAL PROCESSING AND RECEIVING APPARATUS AND METHOD

CROSS REFERENCE TO RELATED APPLICATIONS

This application is a U.S. continuation application filed under 35 U.S.C. 111(a) claiming benefit under 35 U.S.C. 120 and 365(c) of PCT application JP2003/008213, filed Jun. 27, 2003, which claims priority to Application Ser. No. 2002-222005, filed in Japan on Jul. 30, 2002. The foregoing applications are hereby incorporated herein by reference.

BACKGROUND OF THE INVENTION

1. Field of the Invention

The present invention relates to digital signal processing and receiving apparatuses and, more particularly, to a digital signal processing and receiving apparatus, which separates a code signal according to a modulation signal from an analog reception signal received by a reception antenna.

2. Description of the Related Art

Conventionally, as disclosed in, for example, Japanese Laid-Open Patent Application No. 8-8744, a signal processing apparatus, which applies a digital signal process to a reception signal after applying an A/D conversion process. In this signal processing apparatus, a reception signal is sample-held, and an A/D process is repeated continuously for N times during the sample-hold. Then, the N sets of digital data are subjected to a spectrum analysis according to a Fourier transformation so as to take out a sample signal having only a direct-current component. Therefore, according to the above-mentioned conventional signal processing apparatus, a frequency component other than a direct-current component can be removed from a reception signal, and, as a result, a noise of a high-frequency component equal to or higher than a sampling frequency can be eliminated.

On the other hand, there is known an in-vehicle equipment remote control system that performs a control of permission or non-permission of use of a vehicle in accordance with a result of a code check according to radio communication between a portable equipment and an in-vehicle equipment. This system is a system, which, when it is determined that contents of a code according to a modulation signal transmitted from a portable equipment by a predetermined carrier wave in an in-vehicle equipment, locks or unlocks a vehicle door and permits a start of an engine or an electric motor as a power source or checks whether or not the portable equipment exists in the vehicle after start of the vehicle. If the above-mentioned conventional signal processing apparatus is used when extracting contents of a cord from the modulation signal transmitted by the portable equipment in the in-vehicle remote control system, the code contents can be extracted while eliminating a noise of a high-frequency component equal to or higher than a sampling frequency.

In the above-mentioned in-vehicle remote control system, the communication between the in-vehicle equipment and the portable equipment is performed even in a state where a control unit, which controls an engine or an electric motor, is in operation or a state where the engine or the electric motor is being driven. For this reason, there may be a case in which an interference wave is superposed on a frequency band of a carrier wave in a communication between the in-vehicle equipment and the portable equipment, the interference wave being a narrow-band noise such as a clock dividing wave caused by a start of a control unit and a wide-band noise such as an ignition noise, a motor noise, an inerter noise, etc. If such an interference wave is a noise having a large energy, a communication error tends to occur in a communication between the in-vehicle equipment and the portable equipment. Therefore, in order to always perform a communication between the in-vehicle equipment and the portable equipment, it is necessary to surely eliminate an interference wave having a large energy superposed on a frequency band of a carrier wave.

However, it is impossible for the above-mentioned conventional signal processing apparatus to eliminate all interference waves due to various noises that can be generated in a vehicle. For this reason, even if the above-mentioned conventional signal processing apparatus is applied to the above-mentioned in-vehicle remote control system, contents of a code sent from a potable equipment with a carrier wave cannot be demodulated appropriately, which may result in that a check of the contents of the code is not performed appropriately.

SUMMARY OF THE INVENTION

It is a general object of the present invention to provide an improved and useful digital signal processing and receiving apparatus and method in which the above-mentioned problems are eliminated.

A more specific object of the present invention is to provide a digital signal processing and receiving apparatus and method which can maintain a high-communication performance by selectively extracting contents of a desired code even when an interference wave exists within a reception band.

In order to achieve the above-mentioned objects, there is provided according to the present invention a digital signal processing and receiving apparatus comprising: a receiving antenna; an A/D converter that converts analog reception signals received by the receiving antenna into digital signals; and a digital signal processing part that outputs a code signal according to a modulation signal corresponding to a code to be received by the receiving antenna by separating the code signal from the digital signals acquired as a result of digital conversion by the A/D converter in accordance with uniqueness of the modulation signal.

According to the present invention, the analog input signals received by the receiving antenna are digitally converted. Then, the cord signal according to the modulation signal to be received is separated from the digital signal dissociates, and is output. At this time, the separation of the signal is performed in accordance with uniqueness of the modulation signal to be received by the receiving antenna. The modulation signal has uniqueness different from an interference wave. Therefore, according to the present invention, even when an interference wave exists in the reception band, contents of a desired code can be selectively extracted, thereby maintaining the communication performance high.

It should be noted that the "uniqueness of the modulation signal" means an appearance continuation period, an output intensity, etc. of the modulation signal to be received.

In the above-mentioned invention, it is preferable to further comprise a filter circuit provided between the receiving antenna and the A/D converter so as to pass a signal in a frequency band of the modulation signal among the analog reception signals received by the receiving antenna. Since the filter circuit limits the frequency band of the analog reception signal input, to the A/D converter, it can raise the sensitivity as a receiving apparatus and can maintain communication performance high.

Additionally, it may further comprise an amplifier circuit provided between the filter circuit and the A/D converter so as to amplify an output of the filter circuit. Since the amplifier circuit amplifies the analog reception signal from a very small state, a processing load for acquiring a quantization accuracy in the A/D conversion means can be reduced and it can be attempted to improve the reception sensitivity.

Additionally, the digital signal processing and receiving apparatus according to the present invention may comprise: a down converter provided between the receiving antenna and the A/D converter so as to mix the analog reception signals received by the receiving antenna and a local frequency signal by a local oscillator; and an intermediate frequency filter provided between the down converter and the A/D converter so as to pass a signal of a predetermined frequency band among outputs of the down converter. By providing the down converter and the IF filter circuit, the sampling rate in the A/D conversion means can be controlled low, and, as a result, it can be attempted to reduce a power consumption and reduce a processing load.

Additionally, in the digital signal processing and receiving apparatus according to the present invention, it is preferable that the modulation signal has a frequency being changed in accordance with the code, and the digital signal processing part includes noise eliminating means for eliminating a signal as a noise having a frequency fluctuation or an output intensity fluctuation that does not satisfy a predetermined condition from signals acquired as a result of digital conversion by the A/D converter.

In the present invention, the modulation signal to be received by the receiving antenna has a different frequency according to a code. That is, if the code is different, the frequency of the modulation signal is also different. In this respect, if the frequency fluctuation of the output intensity fluctuation of the reception signal during a period in which the code contents change is almost equal to a range of fluctuation associated with the code change of the modulation signal, it can be determined that the reception signal at that frequency had a code to be demodulated. On the other hand, if the frequency fluctuation of the output intensity fluctuation of the reception signal during a period in which the code contents change is little and it does not reach a range of fluctuation associated with the code change of the modulation signal, it can be determined that the reception signal at that frequency is a noise. In the present invention, a signal for which the frequency fluctuation or the output intensity fluctuation does not satisfy a predetermined condition is eliminated as a noise from the signal acquired as a result of digital conversion by the A/D conversion means. Therefore, according to the present invention, contents of a desired code can be selectively extracted since if an interference wave such as a clock noise or the like exists in the reception band, the interference wave can be eliminated as a noise in consideration of the difference between uniqueness of the modulation signal to be received and uniqueness of a noise not to be received.

In the above-mentioned invention, the noise eliminating means may eliminate a signal as a noise having a frequency fluctuation or an output intensity fluctuation equal to or smaller than a predetermined value during a predetermined period from signals acquired as a result of digital conversion by the A/D converter.

Additionally, the digital signal processing and receiving apparatus may further comprise a memory part that learns and stores information regarding the signal eliminated as a noise by the noise eliminating means and provides the information learned and stored to the noise eliminating means in a predetermined case. Accordingly, even when a communication performance decreases due to an interference wave being received during reception of the receiving antenna, the communication performance can be immediately recovered thereafter.

Additionally, if the memory part continuously receives an electric power supply from a predetermined power source, a communication performance can be maintained high immediately after a power is supplied to the noise eliminating means.

Additionally, in the digital signal processing and receiving apparatus according to the present invention, the digital signal processing part may have noise eliminating means for eliminating a signal as a noise having a frequency fluctuation or an output intensity fluctuation exceeding a predetermined rate or a predetermined value from signals acquired as a result of digital conversion by the A/D converter.

Generally, a frequency and an output intensity of a random noise fluctuate randomly at a high rate. Accordingly, if the frequency fluctuation or the output intensity fluctuation is at a high rate or large, it can be determined that the reception signal at that frequency is a random noise. In the present invention, a signal of which frequency fluctuation or output intensity fluctuation is large exceeding a predetermined rate or a predetermined value is eliminated as a noise from the signal acquired as a result of the digital conversion by the A/D conversion means. Therefore, according to the present invention, even if there exists an interference wave of a wide-band in the reception band, the interference wave can be eliminated as a noise in consideration of a difference between uniqueness of the modulation signal to be received and uniqueness of a noise not to be received, and, thus, contents of a desired code can be selectively extracted.

Other objects, features and advantages of the present invention will become more apparent from the following detailed description when read in conjunction of the accompanying drawings.

BRIEF DESCRIPTION OF THE DRAWINGS

FIG. 4 is a circuit block diagram of a receiving part of the in-vehicle equipment or the potable equipment;

DETAILED DESCRIPTION OF THE PREFERRED EMBODIMENTS

Figure 1:
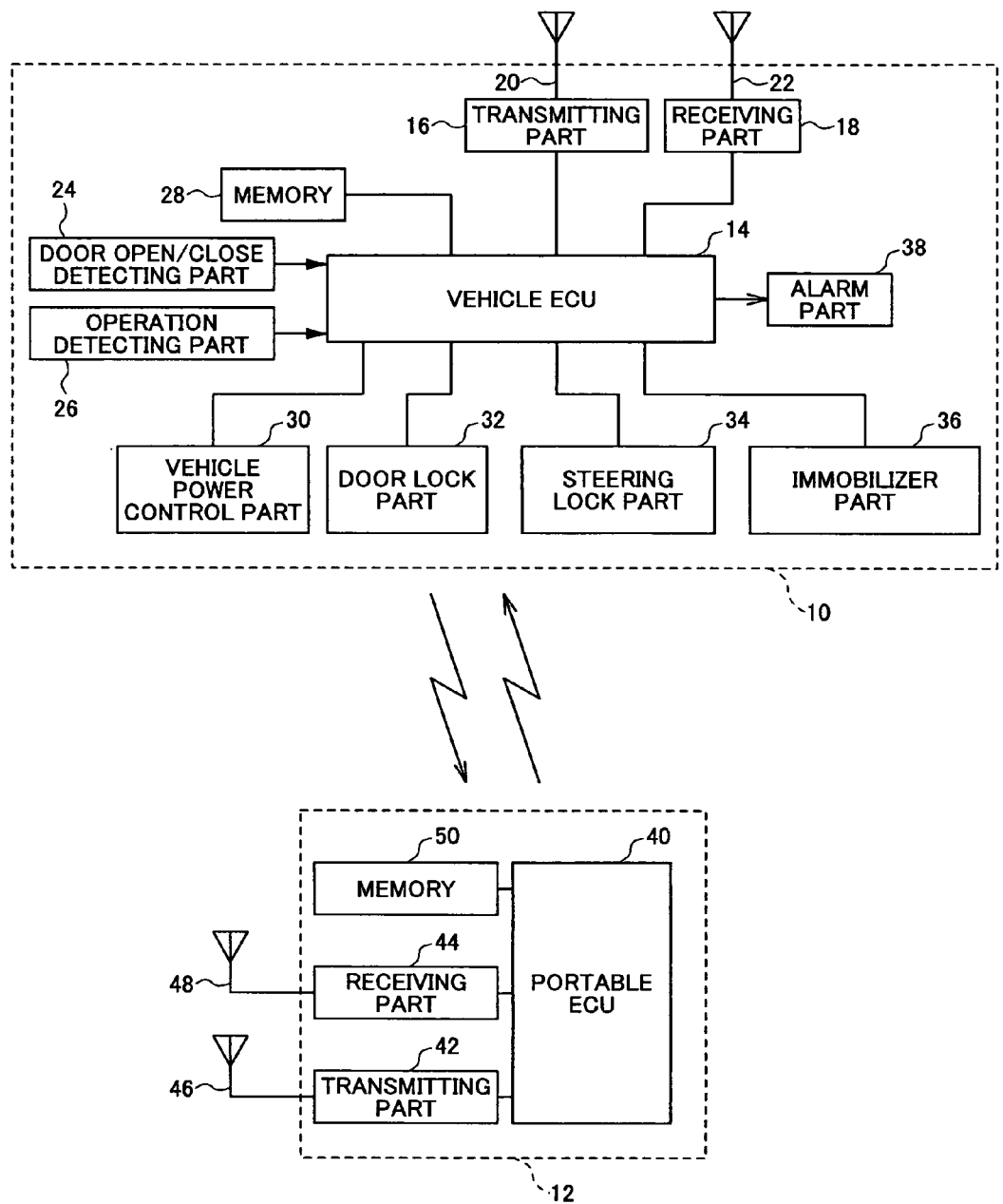
FIG. 1 is a block diagram of a system equipped with a digital signal processing and receiving apparatus according to an embodiment of the present invention.

FIG. 1 shows a structure of a system equipped with a digital signal processing and receiving apparatus according to an embodiment of the present invention. The system according to the present embodiment is an in-vehicle equipment remote control system, which comprises an in-vehicle equipment 10 and a portable equipment 12 having a digital signal processing and receiving apparatus so as to perform a control of permission or non-permission of use of a vehicle based on a result of code check according to radio communication between the in vehicle equipment and the portable equipment.

The in-vehicle equipment 10 is mounted on a vehicle, while the portable equipment 12 is carried by an occupant of the vehicle. The in-vehicle equipment 10 comprises a vehicle electronic control unit 14 (hereinafter, referred to as a vehicle ECU), which is located in the vicinity of a rearview mirror or a center pillar in a vehicle, and is controlled by the vehicle ECU 14. A transmitting part 16 and a receiving part 18 are connected to the vehicle ECU 14. The transmitting part 16 has a transmitting antenna 20. Additionally, the receiving part 18 has a receiving antennal 22. The receiving antenna 22 is located near the rearview mirror or the center pillar in the vehicle. The transmitting antenna 20 is located, for example, on an outer handle of a vehicle door, which an occupant of the vehicle manually operated at a time of boarding or taking baggage in or out. The transmitting antenna 20 covers an entire range within the vehicle, and has a communicable range having, for example, a radius of 1 m from the vehicle door.

The transmitting part 16 outputs data binarized into "0" and "1" according to an instruction from the vehicle ECU 14 after converting the data into a radio frequency in a frequency range of, for example, 300 MHz-400 MHz. The modulated signal output from the transmitting part 16 is sent outward through the transmitting antenna 20. Additionally, when the radio frequency in a frequency range of 300 MHz-400 MHz transmitted by the portable equipment 12 is received through the receiving antenna 22, the receiving part 18 demodulates the received signal into binary data as mentioned later. The signal output from the receiving part 18 is supplied to the vehicle ECU 14.

A door open/close detecting part 24 and an operation detecting part 26 are connected to the vehicle ECU 14. The door open/close detecting part 24 outputs a signal according to a state of open or close of each vehicle door. The vehicle ECU 14 detects the state of open or close of the vehicle door based on the output signal of the door open/close detecting part 24.

The operation detecting part 26 outputs a signal according to existence or non-existence of an operation of the outer handle of a vehicle door. The vehicle ECU 14 detects an operation of the outer handle of the vehicle door and an operation of an ignition switch based on an output signal of the operation detecting part 26.

The vehicle ECU 14 incorporates therein a memory 28, which stores a plurality of control codes different from each other that indicate an object on which a control, such as a door lock control, a vehicle power start control or a drive stop control or the like mentioned later, is to be performed. The vehicle ECU 14 encrypts the coded including a self ID code and a control code stored in the memory 28 at an appropriate timing according to the state of open or close of the vehicle door, an operation existence of the door outer handle, an operation existence of the ignition switch an the like, and supplies the encrypted code to the transmitting part 16. Additionally, the vehicle ECU 14 interprets the data supplied from the receiving part 18, determines whether or not code contents of the ID code contained in the signal match code contents of a desired code such as the self ID code, and performs the process mentioned later when the check is completed.

The vehicle ECU 14 is connected with a vehicle power control part 30, a door lock part 32, a steering lock part 34 and an immobilizer part 36. The vehicle power control part 30 causes, based on an instruction from the vehicle ECU 14, an engine or an electric motor as a power source of the vehicle to start of stop when it is driven. The door lock part 32 causes all vehicle doors to be locked or unlocked based on an instruction from the vehicle ECU 14. The steering lock part 34 permits or prohibits rotation of a steering wheel, which a driver of the vehicle operates when steering the vehicle, based on an instruction from the vehicle ECU 14. Additionally, the immobilizer part 36 permits or prohibits a fuel supply to the engine or an electric supply to the electric motor, or an ignition operation based on an instruction from the vehicle ECU 14.

An alarm part 38 is connected to the vehicle ECU 14. The alarm part 38 causes an alarm lamp provided in the vehicle to be turned on or an alarm speaker to be driven so as to call vehicle occupant's attention. Moreover, the alarm part 38 drives an alarm speaker provided outside the vehicle so as to draw attention of persons present in the vicinity of the vehicle.

The portable equipment 12 is equipped with a portable equipment electronic control unit 40 (hereinafter, referred to as a portable ECU), and is controlled by the portable ECU 40. A transmitting part 42 and a receiving part 44 are connected to the portable ECU 40. The transmitting part 42 has a transmitting antenna 46. Additionally, the receiving part 44 has a receiving antenna 48. The transmitting antenna 46 has a communicable range of, for example, about radius of 5-10 m.

The transmitting part 42 outputs data binarized into "0" and "1" according to an instruction from the portable ECU 140 after converting the data into a radio frequency in a frequency range of, for example, 300 MHz-400 MHz. The modulated signal output from the transmitting part 42 is sent outward through the transmitting antenna 46. Additionally, when the radio frequency in a frequency range of 300 MHz-400 MHz transmitted by the in-vehicle equipment 10 is received through the receiving antenna 48, the receiving part 44 demodulates the received signal into binary data as mentioned later. The signal output from the receiving part 44 is supplied to the portable ECU 40.

In the above-mentioned structure, both the transmitting part 16 of the in-vehicle equipment 10 and the transmitting part 42 of the portable equipment 12 performs an FSK (frequency shift keying) modulation, which shifts the frequency of the carrier wave in accordance with the code contents of Lo-data "0" and Hi-data "1". For example, the modulation is performed by setting a first frequency $f_L$ in the band of 300 MHz-400 MHz as a carrier frequency of the Lo-data "0" and setting a second frequency $f_H$ higher than the first frequency $f_L$ in the band of 300 MHz-400 MHz as a carrier frequency of the Hi-data "1".

It should be noted that the modulation signal corresponding to a combination of the Lo-data "0" and the Hi-data "1" that is sent outward from the transmitting part 16 by the in-vehicle equipment 10 through the transmitting antenna 20 is referred to as a request signal. Additionally, the modulation signal corresponding to a combination of the Lo-data "0" and the Hi-data "1" that is sent outward from the transmitting part 42 by the portable equipment 12 through the transmitting antenna 46 is referred to as a response signal.

A description will now be given of an operation of the in-vehicle equipment remote control system according to the present embodiment. In the system according to the present embodiment, when an outer handle of a vehicle door is operated under a situation that the vehicle door is locked, the in-vehicle equipment 10 transmits a request signal containing the self ID code and an ID code indicating door unlock in a predetermined frequency band (300 MHz-400 MHz) from the transmitting part 16 through the transmitting antenna 20. If the portable equipment 12 is not present in the vicinity of the vehicle door when the request signal is transmitted, a response signal from the portable equipment 12 is not returned to the in-vehicle equipment 10. Thus, the in-vehicle equipment 10 cannot unlock the vehicle door, and the locked state of the vehicle door is maintained.

On the other hand, if the portable equipment 12 is present in the vicinity of the vehicle door when the request signal is transmitted, the portable equipment 12 receives the request signal from the in-vehicle equipment 10 by the receiving-part 44 through the receiving-antenna 44. In this case, in response to the request signal, the portable equipment 12 transmits a response signal of a predetermined frequency band (300 MHz-400 MHz) from the transmitting part 42 through the transmitting antenna 46.

When the in-vehicle equipment 10 receives the response signal from the portable equipment 12 by the receiving part 18 through the receiving antenna 22 after transmitting the request signal for door unlock in the state where the vehicle door is locked, the in-vehicle equipment performs a cross-check of the response signal. Then, the in-vehicle equipment 10 maintain the locked state of the vehicle door if the code contents do not match the code contents of a desired code, and, on the other hand, the in-vehicle equipment 10 determines that, if the contents of the code match the code contents of the desired code, a vehicle occupant carrying the normal portable equipment 12 corresponding to own vehicle is getting in the vehicle. Therefore, the in-vehicle equipment 10 controls the door lock part 32 to cancel the locked state of the vehicle door so as to unlock the door.

Moreover, if the vehicle door is opened and closed after unlocking the vehicle door and an ignition switch provided in the vehicle is turned on, the portable equipment 10 transmits a request signal containing the self-ID code and a control code indicating a vehicle power start in a predetermined frequency band from the transmitting part 16 through the transmitting antenna 20. When the request signal from the in-vehicle equipment 10 is received by the receiving part 44 through the receiving antenna 48, the portable equipment 12 returns a response signal of a predetermined frequency band from the transmitting part 42 through the transmitting antenna 46.

When the in-vehicle equipment 10 does not receive a response signal by the receiving part 18 through the receiving antenna 22 after transmitting the request signal for the vehicle power start in a state where the vehicle power unit (an engine or an electric motor) is not being driven, and when the code contents of the response do not match the code contents of the desired code, the in-vehicle equipment 10 never permits a start of the vehicle power unit. On the other hand, when the code contents of the response signal from the portable equipment 12 match the code contents of the desired code, it is determined that a vehicle occupant carrying the normal portable equipment 12 corresponding to the own vehicle is starting the own vehicle, and a start permission of the vehicle power unit is made. Specifically, a prohibition of rotation of the steering wheel is cancelled, a fuel supply to the engine or an electric supply to the electric motor is permitted and a prohibited state of ignition is cancelled by controlling the steering lock part 34 and the immobilizer part 36, and, thereafter, the vehicle power unit is started by controlling the vehicle power control part 30.

As mentioned above, in the present embodiment, the in-vehicle equipment 10, after transmitting the request signal for door unlocking in the state where the vehicle door is locked, performs the control to unlock the vehicle door based on the response signal transmitted by the portable equipment 12 and the code contents thereof, and also performs, after transmitting the request signal for starting the vehicle power unit in the state where the vehicle power unit is not driven, a control for starting the vehicle power unit based on the existence or non-existence of the response signal transmitted by the portable equipment 12. Therefore, according to the system of the present embodiment, the vehicle door can be unlocked remotely by non-contact method without an operation to the portable equipment and the vehicle according to the radio communication between the in-vehicle equipment 10 and the portable equipment 12, and a permission of a start of the vehicle power unit can be given without insertion of a vehicle key into a key cylinder.

Moreover, in the system according to the present embodiment, he in-vehicle equipment 10 transmits the request signal of a predetermined frequency band, which request signal contains the self-ID code and the control code indicating an execution of the process of checking a presence of the portable equipment 12 in the vehicle, from the transmitting part 16 thorough the transmitting antenna 20 at a constant time interval after a drive of vehicle power unit is started or continuously for a constant time period after the vehicle door is opened or continuously while a vehicle window is open. When the portable equipment 12 receives the request signal from the in-vehicle equipment 10 by the receiving part 44 through the receiving antenna 48, the portable equipment 12 returns, in response to the request signal, the response signal of the predetermined frequency band from the transmitting part 42 through the transmitting antenna 46.

Under the situation that the vehicle power unit is being driven, when the in-vehicle equipment 10 receives the response signal from the portable equipment 12 by the receiving part 18 through the receiving antenna 22 after transmitting the request signal for checking a presence, and if the code contents of the response signal match the code contents of a desired code, the in-vehicle equipment 10 does not perform any processes. On the other hand, when a response from the potable equipment is not received or, even if the response is received, if the code contents of the response do not match the code contents of a desired code, the in-vehicle equipment 10 drives the alarm lamp and the alarm speaker by controlling the alarm part 38 so as to announce the fact that the normal portable equipment 12 is not present in the vehicle to the vehicle occupant and persons in the vicinity of the vehicle.

Thus, in the present embodiment, under the situation that the vehicle power unit is being driven, the in-vehicle equipment performs the process of checking the presence as to whether or not the response signal transmitted by the portable equipment exists and whether or not the normal portable equipment 12 is present in the vehicle based on the code contents of the response signal after transmitting the request signal for checking the existence. Therefore, according to the system of the present embodiment, checking as to whether the portable equipment 12, which is inevitable for controlling locking/unlocking the vehicle door and starting the vehicle power unit, can be performed according to the radio communication between the in-vehicle equipment 10 and the portable equipment 12, thereby avoiding the inconvenience in that locking/unlocking of the vehicle door and restarting of the vehicle power unit cannot be performed due to taking the portable equipment 12 out of the vehicle.

Further, in the system of the present embodiment, if an ignition switch is turned off in a state where the vehicle power unit is being driven, the portable equipment 10 stops the drive of the vehicle power unit by controlling the vehicle power control part 30. Moreover, if the vehicle door is opened and closed by a vehicle occupant and a lock instruction switch (not shown in the figure) provided near the door outer handle is operated after the drive of the vehicle power unit is stopped, the in-vehicle equipment 10 transmits the request signal of a predetermined frequency band containing the self ID code and the control code indicating door lock from the transmitting part 16 through the transmitting antenna 20. When the request signal from the in-vehicle equipment 10 is received by the receiving part 44 through the receiving antenna 48, the portable equipment 12, in response to the request, returns the response signal of a predetermined frequency band from the transmitting part 42 through the transmitting antenna 46.

When the in-vehicle equipment 10 does not receive the response signal from the portable equipment 12 by the receiving part 18 through the antenna 22 after transmitting the request signal for locking the door in the state where the vehicle door is unlocked and when, even if the response signal is received, the code contents of the response signal do not match the code contents of a desired code, the in-vehicle equipment 10 maintains the unlocked state of the vehicle door. On the other hand, when the code contents of the response signal received from the portable equipment 12 match the code contents of the desired-code, it is determined that a vehicle occupant carrying the normal portable equipment 12 corresponding to own vehicle is getting off the own vehicle and the door lock part 32 is controlled so as to cancel the unlocked state of the vehicle door and lock the door.

Thus, in the present embodiment, the in-vehicle equipment 10 performs a control to lock the vehicle door based on existence or non-existence of the response signal transmitted from the portable equipment 12 and the code contents of the response signal after transmitting the request signal for locking the door in the sate where the vehicle door is not locked. Therefore, according to the system of the present embodiment, the vehicle door can be locked remotely in a non-contact manner without operations by the vehicle occupant to the portable equipment 12 and the mechanical key according to the communication between the in-vehicle equipment 10 and the portable equipment 12.

Figure 2:
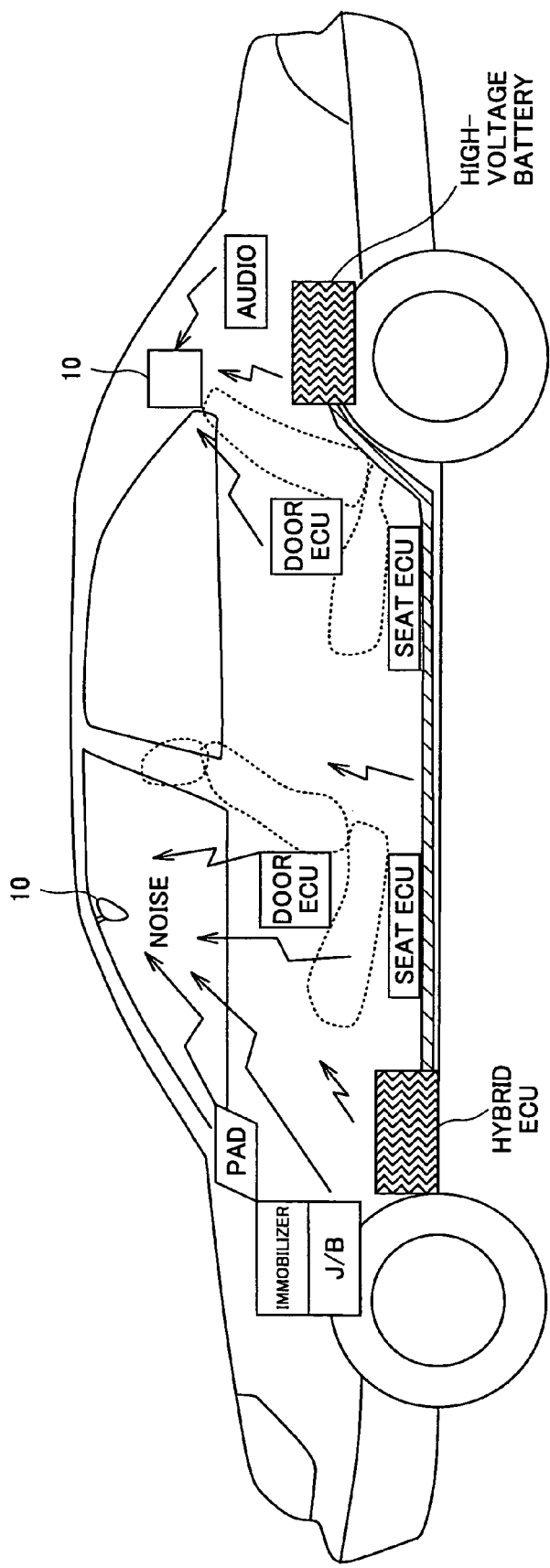
FIG. 2 is an illustration indicating a circumstance in which a signal received by an in-vehicle equipment is influenced by noises.
Figure 3A:
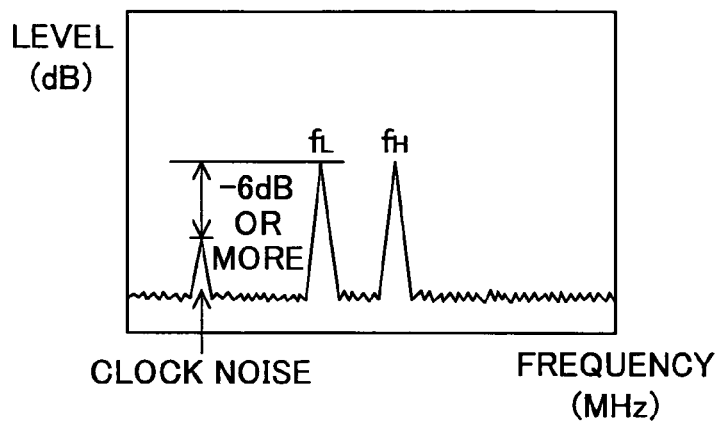
FIGS. 3A, 3B and 3C are diagrams showing a modulation signal to be received by the in-vehicle equipment and a portable equipment by comparing with each other.
Figure 3B:
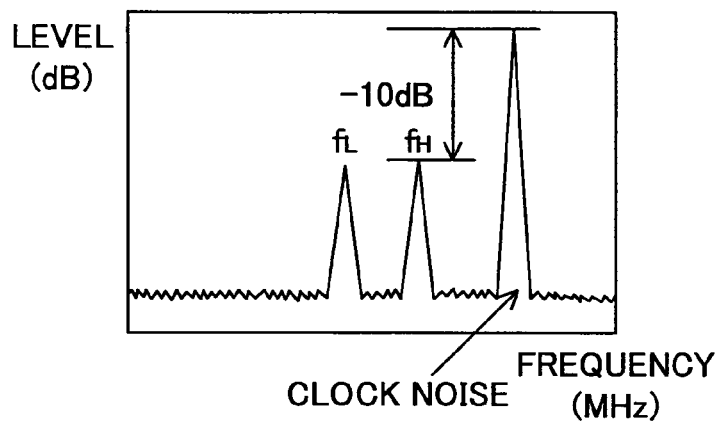
Figure 3C:
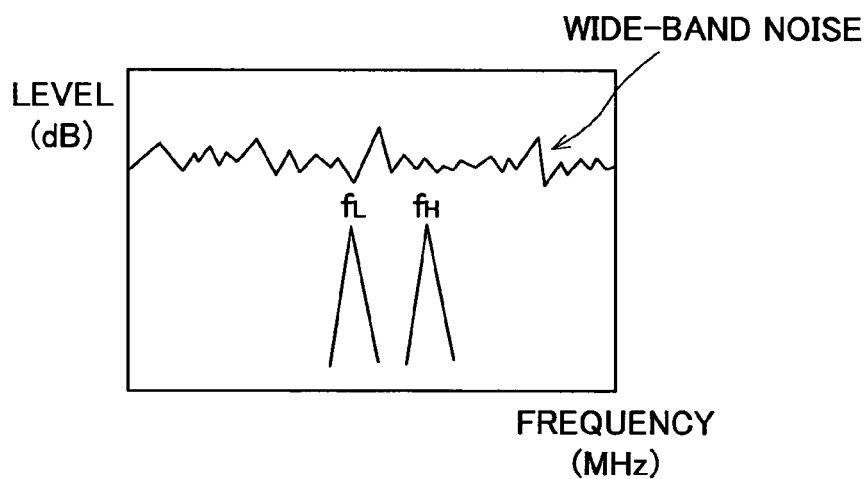

FIG. 2 shows an illustrative view of a situation where the signal received by the in-vehicle equipment 10 receives influences of noises. FIGS. 3A, 3B and 3C show diagrams in which the modulation signals to be received by the in-vehicle equipment 10 and the portable equipment 12 are compared with noises.

In the present embodiment, the in-vehicle equipment 10 receives the response signal which the portable equipment 12 transmits by radio frequency, and the portable equipment 12 receives the request signal, which the in-vehicle equipment 10 transmits by radio frequency. The radio communication between the in-vehicle equipment 10 and the portable equipment 12 is performed also in a state where a vehicle power unit such as an engine or an electric motor is being driven. When the vehicle power unit is being driven, in-vehicle ECUs such as, for example, a door ECU, a seat ECU, an audio ECU or the like other than the vehicle ECU 14 can be activated.

For this reason, the in-vehicle equipment 10 and the portable equipment 12 may receive a clock multiplication wave of a micro-computer in each in-vehicle ECU as a noise directly through a space or a secondary radiation of wiring harness which connects each in-vehicle ECU or a coupling thereof, as shown in FIG. 2. For this reason, the interference wave of a narrow band caused by the clock multiplication wave may be superposed on the band containing the frequencies $f_L$ and $f_H$ of the carrier wave used for radio communication between the in-vehicle equipment 10 and the portable equipment 12, as shown in FIGS. 3A and 3B. Moreover, when an electric motor is used as a power source such as in an electric car or a hybrid car, a wide band interference wave such as a motor noise or an inverter noise may be superposed on a band containing the carrier frequencies $f_L$ and $f_H$ due to an operation of the power unit itself, as shown in FIG. 3C.

In such as case, if various kinds of noises received by the in-vehicle equipment 10 and the portable equipment 12 are interference waves of, for example, equal to or lower than −6 dB, which do not give influences to the reception of the carrier wave such as shown in FIG. 3A, the receiving parts 18 and 44 can demodulates the contents of the coded transmitted by the carrier wave appropriately. Therefore, a communication error hardly occurs in the communication between the in-vehicle equipment 10 and the portable equipment 12. On the other hand, if the above-mentioned noises have an energy greater than the energy of the carrier wave, such as an energy of equal to or greater than +10 dB, for example, as shown in FIGS. 3B and 3C, the contents of the code transmitted by being carried by the carrier wave cannot demodulate appropriately. Therefore, a communication error tends to easily occur in the communication between the in-vehicle equipment 10 and the portable equipment 12. Therefore, in order to always perform appropriate communication between the in-vehicle equipment 10 and the portable equipment 12, it is necessary to eliminate certainly an interference wave having a large energy, which is superposed on the frequency band of the carrier wave.

A description will now be given below in further detail, with reference to FIG. 4 through FIG. 9, of the present embodiment.

FIG. 4 shows a specific structure block diagram of the receiving parts 18 or 44 of the in-vehicle equipment 10 or the portable equipment 12. The receiving parts 18 and 44 have the receiving antennas 22 and 48, respectively. As shown in FIG. 4, the filter circuit 60 is connected to the receiving antenna 22, 48. The filter circuit 60 passes only a signal component in the predetermined bandwidth which contains the carrier frequencies fL and fH of the in-vehicle equipment 10 and the portable equipment 12 among analog input signals received by the receiving antenna 22, 48.

A preamplifier 62 is connected to the filter circuit 60. The preamplifier 62 amplifies linearly a signal which is output by the filter circuit 60. A mixer 64 is connected to the preamplifier 62. The mixer 64 is connected to a local oscillator 66, which generates a local frequency signal of, for example, +10.7 MHz (reception frequency). The mixer 64 down-converts the modulation signal of 300 MHz to 400 MHz received by the reception antenna 22, 48 into an intermediate frequency (IF) of 10.7 MHz by mixing the signal output by the preamplifier 62 and the local frequency signal by the local oscillator 66. An IF filter 68 is connected to the mixer 64. The IF filter 68 passes only a signal component (for example, 10.7 MHz±100 kHz) of the intermediate frequency output by the mixer 64 corresponding to a bandwidth equal to or larger than the tolerances of the carrier frequencies $f_L$ and $f_H$.

A DSP (digital signal processor) tuner 70 is connected to the IF filter 68. The DSP tuner 70 performs a process to extract desired binary data from the modulation signal which is transmitted by the portable equipment 12 or the in-vehicle equipment 10 and to be received by the antenna 22, 48. That is, the DSP tuner 70 is equipped with an A/D converter 72 and a digital signal processing part 74.

The input of the A/D converter 72 is connected to the output of the IF filter 68. The A/D converter 72 quantizes the analog output signal of the IF filter 68 so as to change into digital values. The input of the digital signal processing part 74 is connected to the output of the A/D converter 72. By performing a fast Fourier transform (FFT conversion) on the digital data obtained by the quantization of the A/D converter 72, the digital signal processing part 74 performs an algorithm operation of all signal values, and, as a result, separates and outputs binary data according to a modulation signal to be received.

The digital signal processing part 74 has a first output terminal 76, which outputs the binary data of the modulation signal as a cord signal, and a second output terminal 78, which outputs a squelch signal which changes to high and low according to existence of carrier frequency. Both the outputs of the digital signal processing part 74 are supplied to the above-mentioned vehicle ECU 14 or the portable ECU 40. The vehicle ECU 14 or the portable ECU 40 performs various processes by determining whether or not the code contents concerned match the contents of the desired code in accordance with the output of the digital signal processing part 74.

The digital signal processing part 74 comprises a memory part 80. The memory part 80 stores the data derived by the algorithm operation of the digital signal processing part 74. The digital signal processing part 74 reads, if it is necessary, the data stored in the memory part 80, and perform a process by using the read data in the above-mentioned algorithm operation.

The A/D converter 72 and the digital signal processing part 74 of the in-vehicle equipment 10 described above are connected to a control power source 82. The control power source 82 causes the receiving part 18 to receive a transmission signal from the portable equipment 12, and, on the other hand, intermittently turns on, for example, for 10 ms in each 200 ms so as to prevent a battery from running out while the vehicle power unit is stopped. For this reason, the A/D converter 72 and the digital signal processing part 74 of the in-vehicle equipment 10 are operable intermittently. On the other hand, the memory part 80 connected to the digital signal processing part 74 is connected to a battery (+B) power source 84. The battery power source 84 is a battery, which is mounted on the vehicle. Thus, since the memory part 80 is always supplied with an electric power from the battery power source 84, the memory part 80 maintains the contents of the memory without eliminating the memory data, even if the A/D converter 72 and the digital signal processing part 74 are turned off.

In the above-mentioned structure, a filter circuit 60, which passes only a signal component in the predetermined bandwidth which contains the carrier frequencies $f_L$ and $f_H$ of the in-vehicle equipment 10 and the portable equipment 12, is provided between the receiving antenna 22, 48 and the A/D converter 72 of the DSP tuner 70. In this case, a signal of outside the predetermined band is not input to the A/D converter 72, and the frequency band of the analog reception signal, which is input to the A/D converter 72, is limited within the predetermined bandwidth. Thus, according to the present embodiment, a noise of a band unnecessary for the in-vehicle equipment 10 or the portable equipment 12 is prevented from being quantized by the A/D converter 72. Therefore, according to the structure of the present embodiment, it is possible to improve reception sensitivity and to maintain communication performance high by providing the filter circuit 60 between the receiving antenna 22, 48 and the A/D converter 72.

Figure 5A:
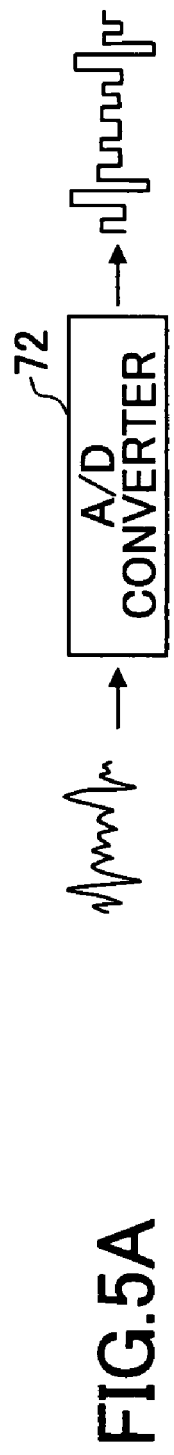
FIGS. 5A and 5B are illustrations for explaining a function of an amplifying circuit.
Figure 5B:
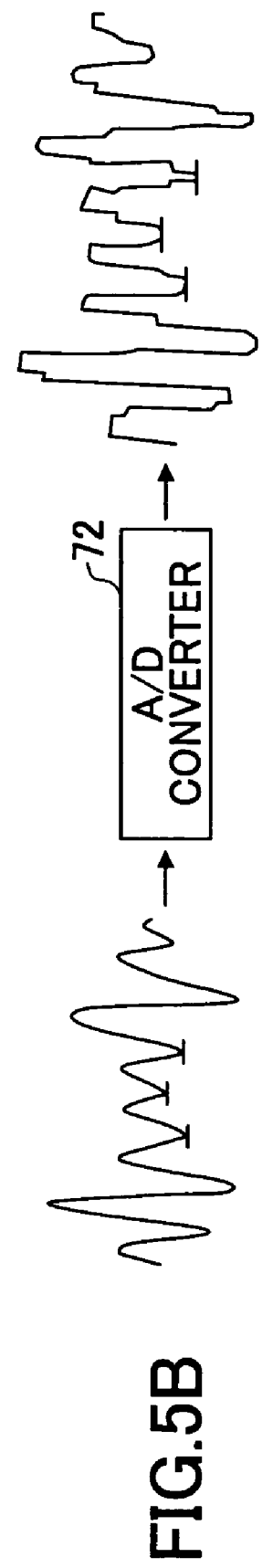

FIGS. 5A and 5B show illustrations for explaining the preamplifier 62 of the present embodiment. It should be noted that FIG. 5A is an illustration showing a relationship between the output and the input of the A/D converter 72 in a structure where the preamplifier 62 is not provided, and FIG. 5B shows a relationship between the input and the output of the A/D converter 72 in the structure of the present embodiment.

In the above-mentioned structure, the preamplifier 62, which carries out linear amplification of the output of the filter circuit 60, is provided between the filter circuit 60 and A/D converter 72. In this case, the amplitude level of the analog reception signal supplied to the A/D converter 72 is increased as compared with the structure in which the preamplifier 62 is not provided. The A/D converter 72 tends to quantize an analog signal as an amplitude level of an input increases. That is, in the case where an input amplitude level is small, digital values having the same level may be calculated and output, as shown in FIG. 5A, when analog values originally having a level difference are quantized by the A/D converter 72. On the other hand, as shown in FIG. 5B, if an input amplitude is large, analog values having a level difference tend to be quantized into digital values different from each other.

For this reason, according to the present embodiment, a digital waveform approximated to an original analog reception signal can be acquired without raising the quantization accuracy of the A/D converter 72. Therefore, according to the structure of the present embodiment, the quantization accuracy can be substantially improved by providing the preamplifier 62 between the filter circuit 60 and the A/D converter 72, and a processing load to acquire the quantization accuracy of the A/D converter 72 can be reduced.

Moreover, in the above-mentioned structure, the mixer 64, which mixes the output of the preamplifier 62 with the local frequency signal according to the local oscillator 66, is provided between the reception antenna 22, 48 and the A/D converter 72. Moreover, the filter 68, which passes only the signal component of a desired intermediate frequency band, is provided between the mixer 64 and the A/D converter 72. In this case, the analog reception signal input to the A/D converter 72 is down-converted from the 300 MHz-400 MHz carrier frequencies $f_L$ and $f_H$ into the intermediate frequency of 10.7 MHz. Moreover, the frequency band of the analog reception signal is limited by the IF filter 68 within the band near the intermediate frequency (10.7 MHz±100 kHz).

For this reason, according to the present embodiment, as compared with a case where an analog signal of the carrier frequencies $f_L$ and $f_H$ is sampled as it is in the A/D converter 72, a sampling rate can be reduced. For example, if the IF filter 68 passes a signal in the band of 10.7 MHz±100 kHz as mentioned above, the pass-band width is 200 kHz. Therefore, in order to acquire a sampled value at a frequency corresponding to at least twice the bandwidth, it is sufficient to set the sampling rate of the A/D converter 72 so that a transmission rate of 400 kbps is acquired. Therefore, according to the structure of the present embodiment, since the frequency of the operation clock of the A/D converter 72 is controlled, it can be attempted to reduce power consumption and also to reduce a processing load to the A/D converter 72 or the digital signal processing part 74 connected at the next stage.

Figure 6A:
FIGS. 6A, 6B, 6C and 6D are illustrations for explaining a method of eliminating a superposed narrow-band noise.
Figure 6B:
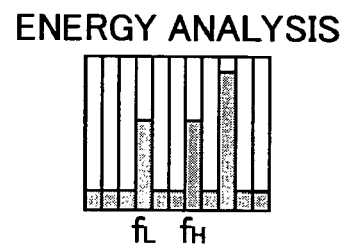
Figure 6C:
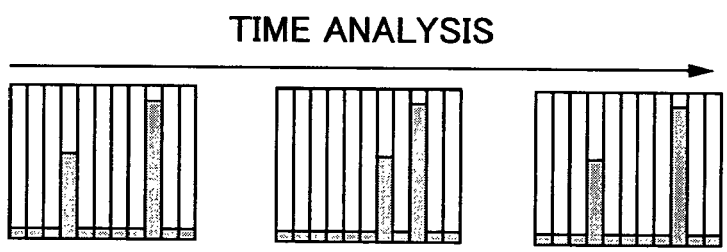
Figure 6D:
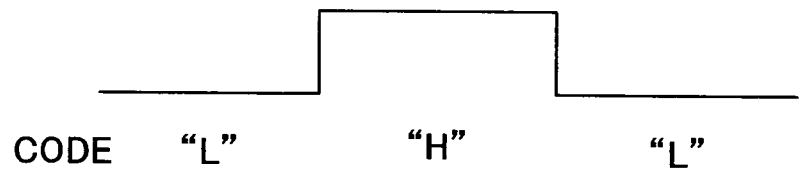

FIGS. 6A, 6B, 6C and 6D show illustrations for explaining a method of eliminating a narrow-band noise caused by a clock multiplication wave superposed on the carrier frequency band of the modulation signal received by the receiving part 18, 44 in the present invention. It should be noted that FIG. 6A is an illustrative chart showing a state where a narrow-band noise caused by a clock multiplication wave having a large energy is superposed on the carrier frequency band of the modulation signal; FIG. 6B is a chart showing an energy analysis result of the spectrum acquired by the FFT transformation of the digital signal processing part 74; FIG. 6C is a chart showing a time analysis result of the spectra; and FIG. 6D is a chart showing a code signal output from the receiving part 18, 44, when the time analysis result shown in FIG. 6C is acquired.

In the present embodiment, the portable equipment 12 and the in-vehicle equipment 10 perform the FSK modulation to change the carrier frequency between the first frequency $f_L$ and the second frequency $f_H$ according to the contents of the cord of "0" and "1", and output the response signal or the request signal. In this case, the receiving part 18 of the in-vehicle equipment 10 and the receiving part 44 of the portable equipment 12 receive the modulation signal having different carrier frequencies according to the contents of the cord. The contents of the cord is maintained at "0" or "1" for at least a constant time (a minimum change period of the cord; bit rate), and after a maximum period during which a state of one content is maintained has passed, the code contents changes to the other content. That is, after the maximum continuation time has passed in a state having one of the carrier frequencies $f_L$ and $f_H$, the modulation signal to be received by the receive section 18, 44 always changes to a state having the other of the carrier frequencies $f_L$ and $f_H$.

On the other hand, the multiplication wave noise of the microcomputer clock by each vehicle ECU other than the ECUs 14 and 40 of the in-vehicle equipment 10 and the portable equipment 12. Moreover, the positional relationship between each vehicle ECU and the receiving part 18, 44 remain unchanged. For this reason, the interference wave caused by the clock multiplication wave is received and acquired by the receiving parts 18 and 44 of the in-vehicle equipment 10 and the portable equipment 12 exceeding the maximum continuation period of the code contents.

Namely, if a spectrum analysis according to an FFT transformation is applied to the digital data after quantizing the analog reception signal, as shown in FIG. 6C, the spectrum levels of both the first frequency $f_L$ and the second frequency $f_H$ of the modulation signal change for each maximum continuation period of the code contents at maximum. On the other hand, the spectrum level of the narrow-band noise caused by a clock multiplication wave is maintained at the same level in a substantially the same frequency.

Therefore, it becomes possible to discriminate a modulating signal to be received and a narrow-band noise based on the changes in the levels if the time analysis of the spectrum level according to the FFT transformation is performed on the digital data. Thereby, it becomes possible to eliminate a narrow-band wave caused by the clock multiplication wave as an unnecessary signal for the receiving parts 18 and 44. Specifically, a frequency component of which spectrum level greatly changes for each predetermined period can be recognized as the modulation signal of the first frequency $f_L$ or the second frequency $f_H$, and, on the other hand, a frequency component of which spectrum level hardly changes can be recognized as a narrow-band noise caused by a clock multiplication wave.

Figure 7:
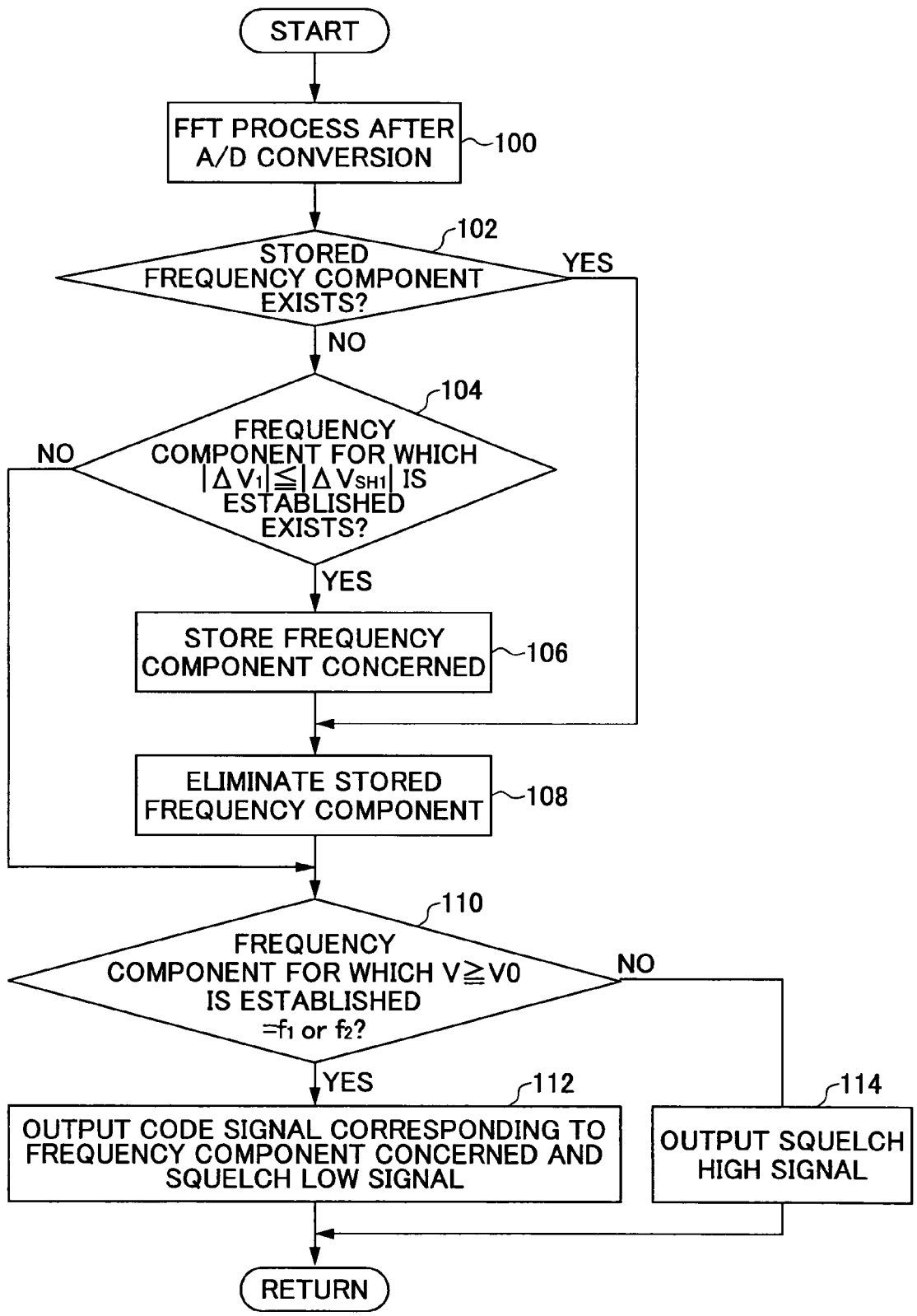
FIG. 7 is a flowchart of a control routine performed to eliminate the narrow-band noise.

FIG. 7 shows a flowchart of an example of a control routine executed in the digital signal processing part 74 of the receiving parts 18 and 44 of the present embodiment so as to eliminate a narrow-band noise caused by a clock multiplication wave. The routine shown in FIG. 7 is a routine started each time the process is completed.

When the routine shown in FIG. 7 is started, the process of step 100 is performed first. In step 100, a process of performing the FFT transformation on the digital data acquired by the quantization of the A/D converter 72 is performed. In step 102, it is determined whether or not a frequency component, which satisfies predetermined conditions, is stored in the memory part 80 by the process of step 106 mentioned later. If it is determined that the frequency component concerned is not stored, the process of step 104 is performed next.

In step 104, it is determined whether or not there exists a frequency component of which a spectrum level change $|\Delta V_1|$ in the maximum continuation period as a result of execution of the FFT transformation in the above-mentioned step 100 is equal to or smaller than a predetermined threshold value $|\Delta V_{SH1}|$. It should be noted that the predetermined threshold value $|\Delta V_{SH1}|$ is a minimum spectrum change by which it can be determined as one caused by a clock noise multiplication wave generated always at the same level. If there exists no frequency component for which $|\Delta V_1| \leq |\Delta V_{SH1}|$ is established, there is no frequency component of which a spectrum level is maintained high and it can be determined that a narrow-band noise caused by a clock multiplication wave is not superposed on the reception signal. On the other hand, if there exists a frequency component for which $|\Delta V_1| \leq |\Delta V_{SH1}|$ is established, there exists a frequency component of which a spectrum level is maintained high and it can be determined that a narrow-band noise caused by a clock multiplication wave is superposed on the reception signal. Therefore, if the affirmative determination is made, the process of step 106 is performed next.

In step 106, a process of storing in the memory part 80 the frequency component for which it is determined in the above-mentioned step 104 that |deltaV1|<=|deltaVSH1| is established is performed. When the process of step 106 is completed, and if it is determined in the above-mentioned step 102 that the frequency component for which $|\Delta V_1| \leq |\Delta V_{SH1}|$ is established is stored in the memory part 80, the process of step 108 s performed next. In step 108, a process of eliminating the frequency component stored in the memory part 80 from the reception signal is performed.

When the process of step 108 is completed, and if it is determined in the above-mentioned step 104 that a frequency component for which $|\Delta V_1| \leq |\Delta V_{SH1}|$ is established does not exist, the process of step 110 is performed next. In step 110, it is determined whether or not the frequency component of which spectrum level V other than the frequency component eliminated from the reception signal in the above-mentioned step 108 is equal to the first frequency $f_L$ or the second frequency $f_H$ of the modulation signal. If an affirmation determination is made, next, the process of step 112 is performed. On the other hand, if a negative determination is made, next, the process of step 114 is performed.

In step 112, a code signal corresponding to the frequency component determined to be the first frequency $f_L$ or the second frequency $f_H$ in the above-mentioned step 110 is output from the first output terminal 76, and a squelch low signal is output from the second output terminal 78. Moreover, in step 114, a squelch high signal is output from the second output terminal 78. After completion of the process of step 112 or 114, the routine at this time is ended.

According to the above-mentioned routine shown in FIG. 7, consideration is given to a difference in uniqueness between the modulation signal to be received, which has frequency changes for each predetermined period, and a narrow-band noise caused by a clock multiplication wave, which is maintained always at the same level in the same frequency, and the narrow-band noise caused by a clock multiplication wave can be eliminated from the reception signal in accordance with the time analysis of the spectrum level according to the FFT transformation.

Therefore, according to the receiving parts 18 and 44 of the in-vehicle equipment 10 and the portable equipment 12 as the digital signal processing and receiving apparatus of the present embodiment, an interference wave can be eliminated even if a narrow-band noise caused by a clock multiplication wave has an extremely high energy intensity, thereby permitting a selective extraction of only the modulation signal to be received from the reception signal. Accordingly, the code contents of the modulation signal can be appropriately demodulated, which permits a communication between the in-vehicle equipment 10 and the portable equipment 12 being performed always appropriately.

Moreover, in the above-mentioned structure, a frequency component relating to a narrow-band noise caused by a clock multiplication wave is stored in the memory part 80. Therefore, according to the present embodiment, if an operation of each vehicle ECU is started during a communication between the in-vehicle equipment 10 and the portable equipment 12 and a narrow-band noise caused by a clock multiplication wave began to occur, it is not possible to determined at that moment whether the reception signal is a noise or a signal relating to the communication between the in-vehicle equipment 10 and the portable equipment 12, which may invite a temporary decrease in the reception sensitivity. However, after that, the clock noise as an interference wave can be eliminated from the reception signal by eliminating a frequency component stored in the memory part 80.

It should be noted that, when an interference wave is received using the above-mentioned method during a communication between the in-vehicle equipment 10 and the portable equipment 12, the reception sensitivity is decreased initially after the interference wave is received, but, thereafter, a process of recovering the reception sensitivity can be performed adaptively if the frequency component to be eliminated from the reception signal is updated and stored in the memory part 80.

Furthermore, in the above-mentioned structure, although it is ideal that the A/D converter 72 and the digital signal processing part 74 of the in-vehicle equipment 10 are always supplied with an electric power so as to be in an activated state, in order to prevent the battery from being run out during the vehicle power unit is stopped, the A/D converter 72 and the digital signal processing part 74 are intermittently supplied with an electric power from the control power source 82 in a period of 10 ms for each 200 ms. For this reason, if the memory part 80, which stores a frequency component relating to a narrow-band noise caused by a clock multiplication wave of the in-vehicle equipment 10 receives an electric power supply from the control power source 82 similar to the A/D-converter 72 or the like, the continuation time of the electric power supply is about 10 ms. Thus, it is difficult to determine whether or not a clock noise exists based on the time analysis of the spectrum level according to the FFT transformation or if the determination can be made, the contents in the memory part 80 is deleted immediately. Therefore, it is necessary to start from the process of determining whether or not a noise exists when a power is turned on at a next time.

On the other hand, in the present embodiment, the contents of the memory are maintained without deleting the stored data even if the A/D converter 72 and the digital signal processing part 74 are turned off since the memory part 80, which stores a frequency component relating to a narrow-band noise caused by a clock multiplication wave of the in-vehicle equipment 10, is connected to the battery power source 84 and is always supplied with an electric power from the battery power source 84. Therefore, according to the present embodiment, even when the A/D converter 72 and the digital signal processing part 74 operate intermittently, it can be determined whether or not a clock noise exists in accordance with the time analysis of the spectrum level according to the FFT transformation. Moreover, the frequency component stored in the memory part 80 can be immediately read out when a power is turned on at a next time, which eliminates a clock noise as an interference wave from the reception signal.

It should be noted that although the memory section 80 always receives an electric power supply from the battery power source 84 in the present embodiment, an amount of current consumption is about several μA to several tens μA, which is extremely small as compared to an amount of current consumption (for example, 20 mA) of the A/D converter 72 and the digital signal processing part 74. For this reason, in the structure of the present embodiment, the in-vehicle battery 84 is positively controlled from running out due to an electric power supply to the memory part 80.

Figure 8A:
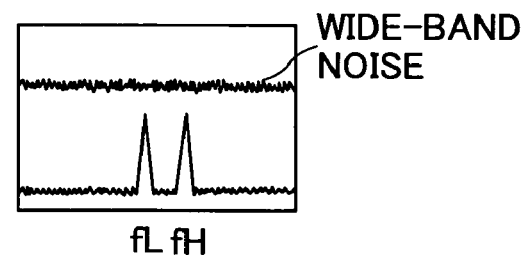
FIGS. 8A, 8B, 8C and 8D are illustrations for explaining a method of eliminating a superposed wide-band nose.
Figure 8B:
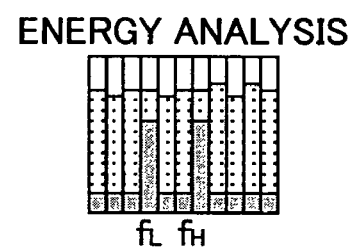
Figure 8C:
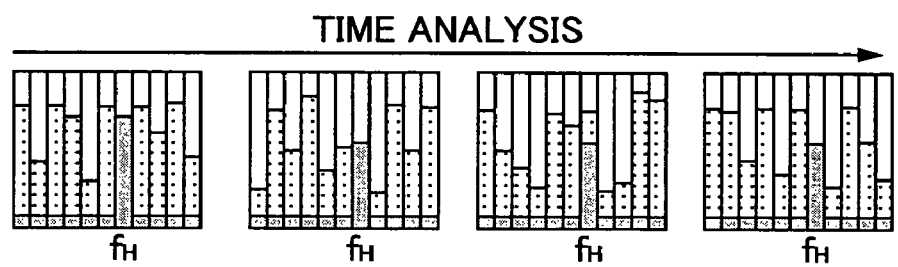
Figure 8D:
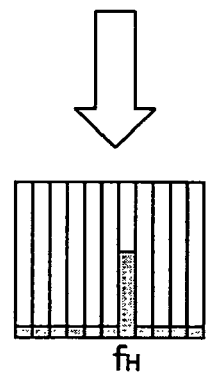

FIGS. 8A, 8B, 8C and 8D show charts for explaining a method of eliminating a wide-band noise such as an inverter noise superposed on the carrier frequency band of the modulation signal received by the receiving parts 18 and 44. It should be noted that FIG. 8A is an illustrative chart showing a state where a wide-band noise having a large energy is superposed on a carrier frequency band of the modulation signal; FIG. 8B is a chart showing a energy analysis result of a spectrum acquired by the FFT transformation of the digital signal processing part 74; FIG. 8C is a time analysis result of the spectrum; and FIG. 8D is a chart of a code signal output from the receiving parts 18 and 44 when the time analysis result shown in FIG. 8C is acquired.

In the present embodiment, the carrier frequency of the portable equipment 12 and the in-vehicle equipment 10 is equal to the first frequency $f_L$ or the second frequency $f_H$ according to the code contents of "0" and "1" The spectrum level of the first or the second frequency $f_L$ or $f_H$ is maintained to be equal to or greater than a fixed level by a minimum change period (bit rate) of the code. On the other hand, a level of a wide-band noise such as a motor noise or an inverter noise generated by an electric car and a hybrid car changes greatly over its entire frequency band.

That is, when the spectrum analysis is performed according to the FFT transformation at a speed much higher than the bit rate of the code in the digital signal processing part 74, the spectrum level of a wide-band noise greatly fluctuates over a entire frequency band as shown in FIG. 8C, while the spectrum level of the first or second frequency $f_L$ or $f_H$ of the modulation signal (in FIG. 8C, the second frequency $f_H$) is maintained to be higher than a fixed level.

Therefore, if the time analysis of the spectrum level according to the FFT transformation is performed on the digital data at a high speed during a one bit rate period, the modulation signal to be received and a random noise can be discriminated. Thereby, it is possible to eliminate a wide-band random noise from the reception signal as an unnecessary signal for the receiving parts 18 and 44. Specifically, a frequency component for which a spectrum level is sharply fluctuated at high speed during a one bit rate period is recognized to be a random noise. On the other hand, a frequency component of which a spectrum level is continuously maintained to be higher than a fixed value is recognized to be the modulation signal of the first or the second frequency $f_L$ or $f_H$ (in FIG. 8D, the second frequency $f_H$).

Figure 9:
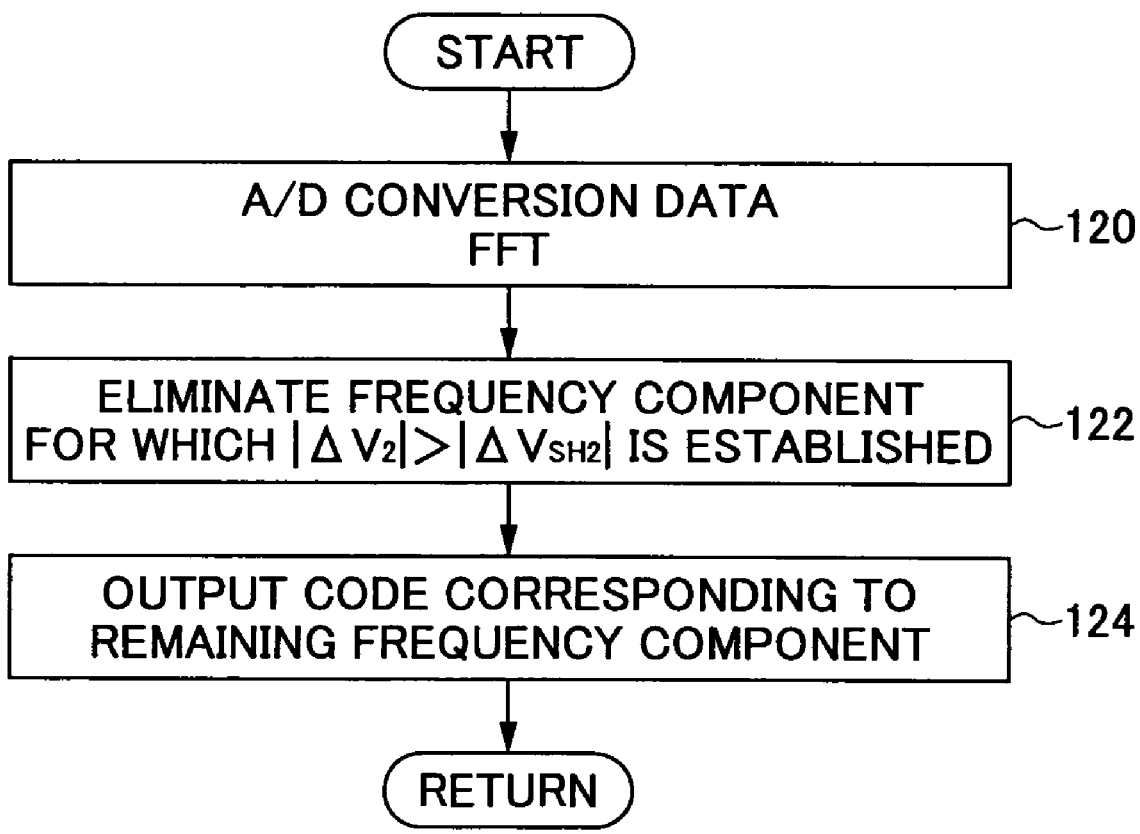
FIG. 9 is a flowchart of a control routine performed to eliminate the wide-band noise.

FIG. 9 shows a flowchart of an example of a control routine performed in the digital signal processing section 74 of the receiving parts 18 and 44 of the present embodiment so as to eliminate a wide-band noise such as an inverter noise or the like. The routine shown in FIG. 9 is a routine started each time the process is completed.

When the routine shown in FIG. 9 is started, the process of step 120 is performed first. In step 120, a process of applying the FFT process to the digital data acquired by the quantization of the A/D converter 72 is performed. In step 122, as a result of execution of the FFT transformation in the above-mentioned step 120, a process of eliminating a frequency component, of which spectrum level change $|\Delta V_2|$ in one bit rate period may exceed a predetermined threshold value $|\Delta V_{SH2}|$, from the reception signal is performed.

In step 124, if the frequency component, of which spectrum level change |deltaV2| in one bit rate period does not exceed the predetermined threshold value |deltaVSH2|, that is, a frequency component of which level is maintained to be higher than a fixed value is equal to the first or second frequency $f_L$ or $f_H$, a code signal corresponding to the frequency component is output from the first output terminal 76 and a squelch low signal is output from the second output terminal 78. When the process of step 124 is completed, the routine at this time is ended.

According to the routine shown in FIG. 9, consideration is given to a difference in uniqueness between the modulation signal to be received and maintained at a level greater than a fixed level and a wide-band random noise of which level fluctuates up and down randomly, and the wide-band random noise can be eliminated as an interference wave from the reception signal.

Therefore, according to the receiving parts 18 and 44 of the in-vehicle equipment 10 and the portable equipment 12 as a digital signal processing apparatus of the present embodiment, if there exists a wide-band noise such as a motor noise by an electric motor or an inverter having an extremely large total energy, specifically, if a wide-band noise having an energy intensity higher than an energy intensity of the modulation signal to be received by 30-40 dB exists, the interference wave can be eliminated, and, thereby, only the modulation signal to be received can be selectively extracted from the reception signal. Thus, the code contents of the modulation signal can be appropriately demodulated, and a communication between the in-vehicle equipment 10 and the portable equipment 12 can always be performed appropriately.

It should be noted that, in the above-mentioned embodiment, each of the receiving antenna 22 of the in-vehicle equipment 10 and the receiving antenna 48 of the portable equipment 12 corresponds to a "receiving antenna"; the A/D converter 72 corresponds to an "A/D converter"; the digital signal processing part 74 of the DSP tuner 70 corresponds to a "digital signal processing part"; the preamplifier 62 corresponds to an "amplifier circuit"; the mixer 64 corresponds to a "down converter"; and the memory part 80 corresponds to a "memory part". Moreover, the digital signal processing part 74 performing the process of step 104 shown in FIG. 7 and the process of step 122 shown in FIG. 9 corresponds to "noise eliminating means".

In the above-mentioned embodiment, although the receiving parts 18 and 44 of the in-vehicle equipment 10 and the portable equipment 12 receive the signal of the frequency in the range of 300 MHz-400 MHz which is transmitted by the transmitting parts 42 and 16, a signal of a frequency band other than that may be used.

The present invention is not limited to the specifically disclosed embodiments, and variations and modifications may be made without departing from the scope of the present invention.

What is claimed is:

1. A digital signal processing and receiving apparatus comprising:
   a receiving antenna;
   an A/D converter that converts analog reception signals received by said receiving antenna into digital signals; and
   a digital signal processing part that outputs a code signal according to a modulation signal corresponding to a code to be received by said receiving antenna by separating the code signal from the digital signals acquired as a result of digital conversion by said A/D converter by removing from the reception signals a frequency component having an amount of change that is smaller than a threshold value for a maximum continuation period during which the code can be maintained,
   wherein the threshold value is a minimum spectrum change needed to detect a clock noise multiplication generated continuously at a same level,
   wherein said digital signal processing part has noise eliminating means for eliminating a signal as a noise having a frequency fluctuation or an output intensity fluctuation exceeding a predetermined rate or a predetermined value from signals acquired as a result of digital conversion by said A/D converter.

2. A digital signal processing and receiving method comprising:
   converting analog reception signals received by a receiving antenna into digital signals; and
   outputting a code signal according to a modulation signal corresponding to a code to be received by said receiving antenna by:
      performing a fast Fourier transform (FFT) on the converted digital signals,
      performing a spectrum analysis on the FFT transformation separating the code signal from the digital signals acquired as a result of digital conversion by removing from the reception signals a frequency component having an amount of change that is smaller than a threshold value for a maximum continuation period during which the code can be maintained, and
      extracting the code from the analyzed signal,
   wherein the threshold value is a minimum spectrum change needed to detect a clock noise multiplication generated continuously at a same level, the method further comprising eliminating a signal as a noise having a frequency fluctuation or an output intensity fluctuation exceeding a predetermined rate or a predetermined value from signals acquired as a result of the digital conversion.

3. A digital signal processing and receiving apparatus comprising:
   a receiving antenna;
   an A/D converter that converts analog reception signals received by said receiving antenna into digital signals; and
   a digital signal processing part that outputs a code signal according to a modulation signal corresponding to a code to be received by said receiving antenna by:
      performing a fast Fourier transform (FFT) on the converted digital signals,
      performing a spectrum analysis on the FFT transformation at a higher speed than the bit rate of the code by removing from the analyzed signals a frequency component having an amount of change that is larger than a threshold value for a maximum continuation period during which the code can be maintained, wherein the threshold value is a minimum spectrum change needed to detect a wideband noise across a frequency spectrum and
      extracting the code from the analyzed signals;
   wherein said modulation signal has a frequency being changed in accordance with the code, and said digital signal processing part includes noise eliminating means for eliminating a signal as a noise having a frequency fluctuation or an output intensity fluctuation that does not satisfy a predetermined condition from signals acquired as a result of digital conversion by said A/D converter; and wherein said noise eliminating means eliminates a signal as a noise having a frequency fluctuation or an output intensity fluctuation equal to or smaller than a predetermined value during a predetermined period from signals acquired as a result of digital conversion by said A/D converter.

4. The digital signal processing and receiving apparatus as claimed in claim 3, further comprising a memory part that learns and stores information regarding said signal eliminated as a noise by said noise eliminating means and provides the information learned and stored to the noise eliminating means in a predetermined case.

5. The digital signal processing and receiving apparatus as claimed in claim 4, wherein said memory part continuously receives an electric power supply from a predetermined power source.

* * * * *